No. 770,957.

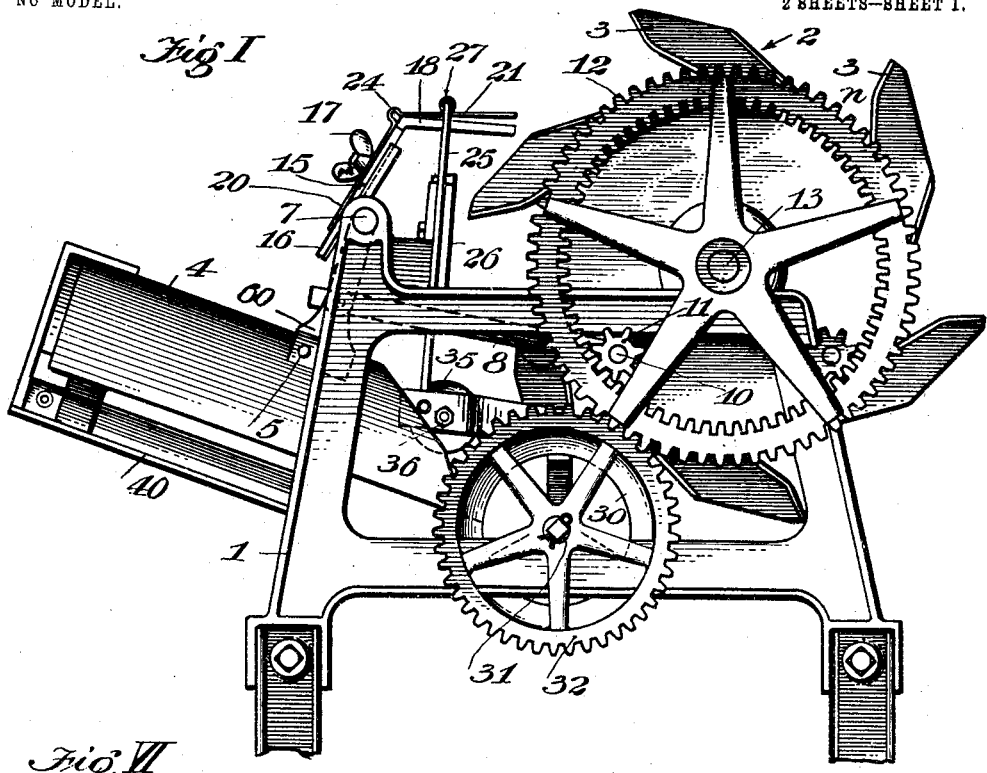
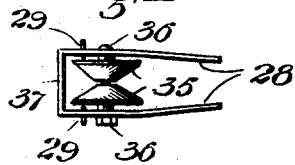
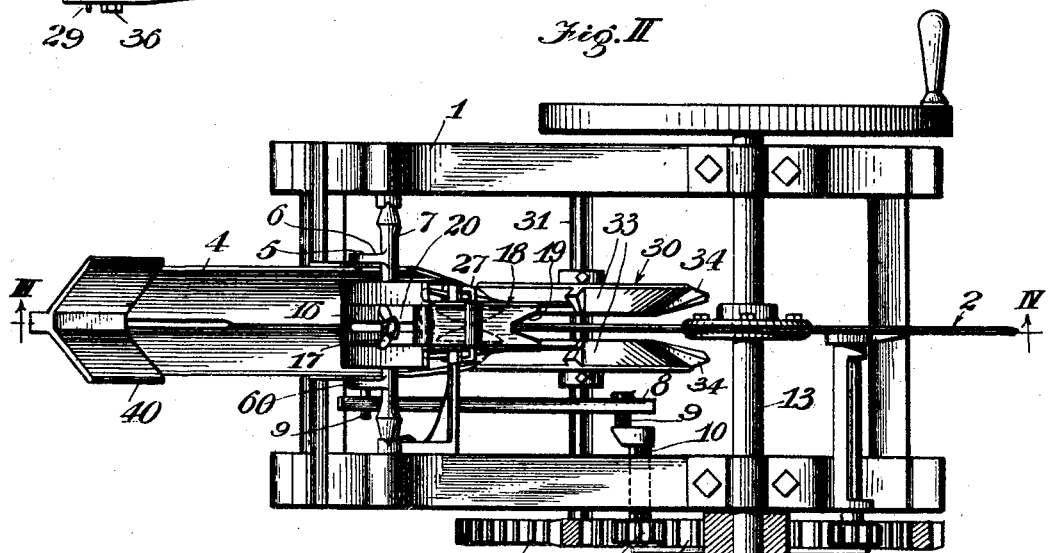

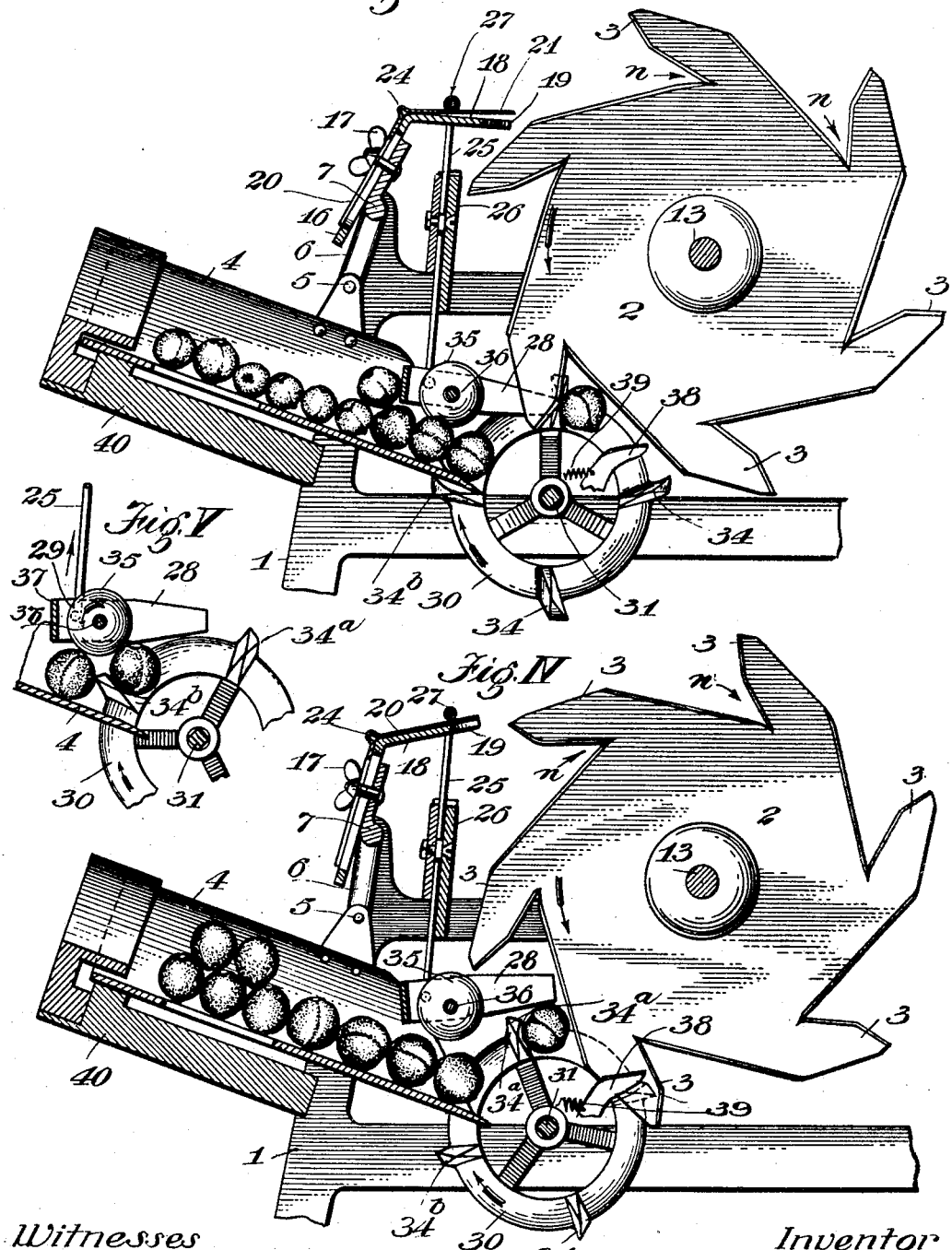

Patented September 27, 1904.

UNITED STATES PATENT OFFICE.

JOHN SMITH BRIGGS, OF LOS ANGELES, CALIFORNIA.

FEEDER FOR FRUIT-PITTING MACHINES.

SPECIFICATION forming part of Letters Patent No. 770,957, dated September 27, 1904.

Application filed August 10, 1903. Serial No. 168,884. (No model.)

*To all whom it may concern:*

Be it known that I, JOHN SMITH BRIGGS, a citizen of the United States, residing at Los Angeles, in the county of Los Angeles and State of California, have invented a new and useful Feeder for Fruit-Pitting Machines, of which the following is a specification.

This invention relates to an improved feeding mechanism adapted to be applied to fruit-pitting machines, and especially to that class of machines described by me in Letters Patent No. 460,740, dated October 6, 1891.

The primary object of this invention is to provide feeding mechanism whereby as the fruits are delivered by the feed-trough toward the pitting mechanism each fruit is automatically and positively held and delivered to such pitting mechanism and the feeding positively controlled and regulated.

A further object is to provide such mechanism in simple, cheap, and durable form, which shall be positive and efficient in operation.

Another object of my present invention is to provide improved means for conveying the fruits to and directing them squarely upon the edge of the cutter-disk.

Another object is to prevent the said fruits from being thrown out of the machine by centrifugal force when fed rapidly to the cutter-disk by a rotary feeder.

A further object is to provide feeding mechanism which will not bruise delicate fruits.

With these objects in view my invention consists generally in an automatic feeding mechanism whereby as the fruits pass into the machine through a feed-trough in single file the foremost fruits are positively delivered to the pitting mechanism in rapid succession and the feeding forward of the fruits in the feed mechanism automatically controlled.

My invention consists, further, in a vertically-reciprocating rotatable feeder mounted between a pair of pivoted fingers and adjusted to impinge forwardly of its bearings upon the fruits, thereby to impart an additional impulse to the forward movement of the fruits.

The invention consists, further, in providing in connection with pitting mechanism a vibratory feed-trough in combination with rotatable means adapted to positively control the feeding of the fruits to the pitting mechanism and insure the delivery of each fruit thereto as predetermined. Said rotatable means are so mounted that it will not injure the fruits.

The invention consists, further, in providing in connection with rotary cutter-blades and a reversely-rotating conveyer means cooperating with said rotating conveyer to direct the fruits properly to said blades and to prevent centrifugal action of said rotary conveyer from throwing the fruits out of the machine or away from said blades.

More specifically my invention consists in the mechanism, construction, and combination of parts hereinafter described, and particularly pointed out in the claims.

Referring to the accompanying drawings, Figure I is a side elevation of a fruit-pitter constructed in accordance with and embodying my invention. Fig. II is a plan view thereof, partly in section. Figs. III and IV are fragmental vertical sections on line III IV, showing only so much of the machine as is necessary to illustrate the action of the rotary feeder, the same being shown in the extreme positions it assumes during the operation. Fig. V is a fragmental section showing another position of the feeder. Fig. VI is an enlarged detail plan view of the rotary feeder.

As illustrated in the drawings, 1 is the main frame of the machine, and 2 is the revolving cutting-disk, provided with forwardly-projecting blades 3, which form, with the opposite knife-edges of the disk proper, V-shaped notches *n*.

The vibratory V-shaped feed-trough 4 is mounted in a guide-frame 40 and pivoted at 5 to the depending arms 6 and 60, attached to the rock-shaft 7. To the arm 60 is pivoted, preferably at the extreme lower end thereof, the pitman 8, said pitman being reciprocated by any suitable means, as by a wrist-pin 9, connected with a shaft 10, provided with a pinion 11, meshing with the internal gear-teeth of a cog-wheel or gear 12, which is mounted upon the main shaft 13. The rock-shaft 7 is preferably provided with an upward extension 14, furnished with ribs 15 on one face thereof. A slotted slide 16 is mounted between said ribs and provided with a set-screw having a thumb-nut 17 for adjusting said slide to raise or lower the same. The slide 16, as shown, is provided with the arm or extension 18, having a flat upper face. Said arm 18 may be bifurcated at 19 to avoid interfering with the cutting-disk 2.

20 is a leaf-spring slotted to correspond with slide 16, so as to be held in place thereon by thumb-nut 17, and having an extension 21, bent to extend over extension 18, and bifurcated to correspond with the bifurcation 19 of said extension 18. Said spring 20 is preferably arched at 24, as shown, to make the extension 21 more resilient. Arm 18 forms a support for spring-arm 21, moving with said spring and guarding it from undue downward flexure.

25 is a vertically-reciprocating member, desirably a rod, playing in a guide 26 and preferably provided at its upper end with an anti-friction-roller 27, adapted to roll upon the upper face of the extension 18 when said extension is oscillated by the rock-shaft 7.

28 designates a pair of guard-fingers each pivoted at 29 to the reciprocating member 25, the inner end of said fingers normally resting upon the periphery of a rotating conveyer 30. Said conveyer may consist of a pair of disks fixed near to each other upon a shaft 31, provided with a driven gear-wheel 32. Each of said disks is preferably provided with a periphery beveled at 33, as shown, and a series of suitably-spaced flights or feed-lugs 34, the lugs of one disk being placed opposite to those of the other, as shown, being thereby adapted to receive and carry the fruits on respective lugs between said beveled portions of the disk.

35 designates a pair of rotatable feeders mounted between the fingers 28 and having bearings 36 in said fingers, said bearings 36 being slightly in advance of pivots 29. Said fingers 28 are desirably maintained in fixed relation to each other with the lower edges parallel, and to this end are preferably formed in one piece, as shown, being connected by an end piece 37, as shown.

38 designates one of the pulp-severing knives yieldingly held in the path of the fruits by a spring 39. A fragment only of these parts is shown, since they form no part of my present invention.

Figs. III, IV, and V illustrate the operation and relative adjustment of the vibratory feed-trough 4, the cutter-disk 2, rotary conveyer 30, rotary feeder 35, and fingers 28, connected with said feeder.

The resilient spring-arm 21 of spring 20 partially sustains the weight of the feeder and its attachments and is designed to be used for delicate and overripe fruits to prevent bruising.

From the foregoing description it will be seen that the whole feed mechanism may be vertically adjusted by means of thumb-nut 17, and thereby adapted to fruit of different sizes.

The spring 20 may be adjusted independently of the part 16.

The feeding apparatus should be adjusted by raising the part 16 and bifurcated arm 18 high enough so that the rotary feeding-disks 35 will offer little or no obstruction to the fruits advancing thereunder in single file to the conveyer 30. The chief objects of the feeding mechanism are to compel the fruits to advance in single file to the conveyer 30 and to hold them in place on said rotary conveyer 30 while they are being carried forward to the cutting and pitting mechanism. A fruit is shown in Fig. V as being carried up by the rotary conveyer, the guard-fingers bearing thereon and pressing downwardly (having raised therewith, as shown) directing the fruit correctly to the cutter-blades as well as holding the fruit against the centrifugal action of the conveyer, which tends to throw the fruit off the conveyer before it is caught by the cutting-notches $n$.

In Fig. IV the pair of lugs $34^a$ of said conveyer have just passed out of the way of the fruit which will be caught (see Fig. III) by the advancing pair of lugs $34^b$, the lower end of the feed-trough having meantime receded from the conveyer into the position shown in Fig. III.

In Fig. V is illustrated the rotary action of the feeder in holding the fruit positively upon the upcoming pair of lugs, said lugs having advanced a little from the positions shown in Fig. III. In said Fig. V the rotary feeding-disks 35 have begun their upward movement, said movement being timed to keep them in contact with the ascending fruit until the fruit reaches fingers 38, which operate as guards to keep said fruit snugly down between the bevels 33 along the periphery of the conveyer 30. The part 37, which connects feed-fingers 28, assists in compelling the fruits to advance to the conveyer in single file, as will be understood by referring to Fig. III. The feed-trough 4 is drawn back partially away from the rotary conveyer just as the lugs reach the fruit. This partial withdrawal of the feed-trough insures the dropping of single fruits onto the lugs to be held thereon by the feeder 28. The conveyer 30 consists, preferably, of two independently-rotatable disks beveled, as shown in Fig. V, and is mounted over the lower end of the feed-trough directly astride the center thereof, this construction and arrangement adapting the conveyer to act as above described. Said conveyer 30 consists of a pair of beveled disks and is mounted with its upper edges astride the path of movement of the knives 3, being thus adapted to coöperate with the pivoted fingers 28, which hold the fruits down against said rotating conveyer, thus maintaining the advancing fruits in position to be caught squarely across the center by the cutting-notches n of the cutting-disk. The rotary feeding-disks 35, having bearings 36 in said fingers slightly in advance of the finger-pivots 29, act as a weight to keep said feed-fingers bearing gently down upon the advancing fruits to counteract the centrifugal force of the rotary conveyer 24 and, as before stated, to direct the fruit correctly into the path of the cutter-blades. Owing to the yielding movements of the feeder and feed-fingers said parts will not bruise delicate fruits and also will adjust themselves to different sizes of fruit. The fingers being pivoted at 36, their free ends may rise with the fruit as it is carried off by the rotary conveyer. After the fruits are caught upon the cutting-notches n of the blades 3 they are operated upon by pulp-severing and pit-removing mechanism, which forms no part of my present invention and is therefore not shown or described in detail and which may be of the ordinary or any preferred construction. The roller 27 is preferably liftably suspended, being held down by gravity only, so that unusually large fruits may pass beneath the feeder 28 by lifting the roller 27 from the plate 18, so that the feeder will not bruise a fruit if it strikes on top thereof.

The operation is as follows: Fruits are delivered to the feed-trough 4. The foremost fruit will roll or slide down the trough until it comes against the rotary conveyer 30. The apparatus being placed in operation, the main shaft 13 will be revolved, causing reciprocation of the rotary feeder and guard-fingers through the wheel 12, the internal teeth thereof meshing with the pinion 11 on the shaft 10. The wrist-pin 9, fixed on the shaft 10, being carried around, operates the bar or pitman 8, the other end of which is in turn pivoted to the arm 60 of the rock-shaft. The feed-trough 4 being pivoted to the arms 6 60, reciprocation thereof with the arms is obtained. The rocking shaft 7 vertically reciprocates the guard-fingers 28 through vertically-movable rod 25, operatively connected with the arm 18, adjustably mounted on the rock-shaft. As the rotary feeder 35 is pivoted between the fingers 28 near the pivoted ends thereof, the feeder reciprocates therewith. One complete reciprocation of the feed-trough 4 and of the feeder 35 and guard-fingers 28 takes place while the rotary conveyer is revolving to carry up from the end of the feed-trough a given pair of carrier-lugs and bring the next pair up to the end of the feed-trough. As a pair of carriers or lugs pass the feed-trough the trough is drawn back, permitting the respective fruit to drop thereon. At the same time the reciprocation begins to carry the feeder 35 upward, causing it to rise with the ascending fruit and hold it onto the conveyer. As the conveyer continues to revolve the fruit is carried up to the cutter-blades, and as the fruit ascends with the conveyer-flights the pivoted guard-fingers rest upon the fruit, yieldingly holding it in place. The fingers being separated a distance from each other, a groove or trough is provided therebetween, in which the fruit rests. The fingers thus not only hold the fruit against the centrifugal action of the conveyer, but hold and direct it into proper position with respect to the blades. As the fruit is carried up the respective cutter-blade passes down between the fingers and the fruit is caught on the notched portions n of the blade and carried through to the pulp-severing and pit-removing mechanism. (Not fully shown.) As the fingers are pivoted to the vertical rod 25 and the rotary feeder journaled in the fingers, the feeder 35 and the fingers are adapted to yield upward to accommodate the larger fruit, the vertical rod 25 sliding through the guide 26 for this purpose, the upper end of the standard being free on the arm 18. When the rotary conveyer has revolved to bring another pair of carriers or lugs up to the end of the trough 4, the operation is automatically repeated. With this mechanism and arrangement the apparatus may be run with great rapidity, thus very materially increasing its capacity. The vertical reciprocation of the pivoted ends of the guard-fingers and of the rotary feeder 30 may be adjusted as required through the slide 16, thumb-nut 17, and extension 14 of the rock-shaft. The feeder 35 being capable of easy rotation, readily turns on its axis as it bears against a moving fruit, and therefore as soon as the top of a fruit has reached a point in advance of the pivot of the feeder the downward pressure of said feeder upon a fruit will tend to move the fruit forward, causing it to roll in the proper direction.

It is thus seen that I provide rotating feeding mechanism which I have described as in the form of independently-rotatable disks yieldingly mounted in connection with yielding fingers, which is adapted to positively feed forward to the pitting mechanism each fruit at a predetermined interval, to positively deliver each fruit to the pitting mechanism, and control the downward movement of the fruits in the feed-trough.

It is obvious that many modifications and many mechanical equivalents for elements which I have shown and described will readily suggest themselves to one skilled in the art, and I therefore do not limit myself to the exact elements or constructions shown or described.

What I claim, and desire to secure by Letters Patent of the United States, is—

1. The combination, with cutting mechanism, of a revolving conveyer adapted to feed fruits thereto, means for directing fruits to said revolving conveyer, said conveyer adapted to lift the fruits singly as they leave said feeding means, a rotary feeding-disk adapted to impinge rearwardly upon the advancing fruits, a rod whereby said disk is suspended, and means for reciprocating said rod, said last-named means timed to cause the feeding-disk to impinge rearwardly upon the fruits as they are lifted by the conveyer.

2. The combination, with cutting mechanism, of a revolving conveyer adapted to feed fruits singly thereto, a trough for directing fruits to said conveyer, a rotary feeder above the delivery end of said trough and adapted to feed fruits singly therefrom, means for suspending said feeder, and mechanism for lifting said suspending means when a fruit is fed from said trough to said conveyer.

3. The combination, with cutting mechanism, of a revolving conveyer adapted to carry fruits thereto, means for directing fruits to said revolving conveyer, parallel fingers yieldingly mounted above said means and extending toward said conveyer, revoluble feeding means carried by said fingers, and means for reciprocating said fingers and feeding means at predetermined intervals.

4. In a feeder mechanism for fruit-pitters, the combination, with pitting mechanism, of a conveyer provided with flights, a vibratory trough adapted to deliver fruits to said conveyer and a rotary feeder liftably suspended adjacent the delivery end of the trough.

5. In a feeder mechanism for fruit-pitters, the combination, with cutting mechanism, of a revolving conveyer adapted to carry fruits thereto, means for directing fruits to said conveyer, means for feeding single fruits to said conveyer, and guard-fingers above said conveyer and substantially tangent to the top of the periphery thereof, operating in conjunction with said conveyer to prevent said conveyer throwing the fruits out therefrom.

6. In a feeder mechanism for fruit-pitters, the combination of a revolving cutting-disk, a revolving conveyer in operative connection therewith, a feed-trough leading to said conveyer, a vertically-movable revoluble feeder and parallel guard-fingers above said conveyer and normally extending approximately horizontally over the top of the periphery thereof, said fingers operating between said feeder and conveyer and adapted to be lifted by the advancing fruits.

7. In a feeder mechanism for fruit-pitters, the combination, of a revolving cutting-disk, a revolving conveyer in operative connection therewith, a reciprocating feed-trough leading to said conveyer, a vertically-movable revoluble feeder, and parallel guard-fingers operating between said feeder and conveyer.

8. In a feeder mechanism for fruit-pitters, the combination, of a revolving cutting-disk, a revolving conveyer in operative connection therewith, a feed-trough leading to said conveyer, a vertically-yielding revoluble feeder mounted above said conveyer, and parallel guard-fingers extending out from the end of said trough against said conveyer, the outer ends thereof adapted to yield vertically.

9. In a feed mechanism for fruit-pitters, in combination, a feed-trough, a conveyer adapted to receive fruit from said trough, parallel pivoted fingers, a support therefor liftably pivoted, suspended above said trough, a rotatable feeder between said fingers, and means for reciprocating the support.

10. In a feed mechanism for fruit-pitters, in combination, a reciprocating feed-trough, a conveyer adapted to receive fruit from said trough, parallel pivoted fingers, a support therefor liftably suspended above said trough, a rotatable feeder between said fingers and means for reciprocating the support, and means for adjusting the vertical reciprocation of said support.

11. In a feed mechanism for fruit-pitters, in combination, a feed-trough, a two-part rotary conveyer adapted to receive fruit from said trough, parallel pivoted fingers suitably mounted in fixed relation to each other, a rotatable feeder between said fingers, and means for vertically reciprocating the pivoted end of said fingers, the free end of said fingers normally resting upon said rotary conveyer.

12. In a feed mechanism for fruit-pitters, in combination, a feed-trough, a two-part rotary conveyer adapted to receive fruit from said trough, parallel pivoted fingers suitably mounted in fixed relation to each other, a rotatable feeder between said fingers, means regulating the throw of the vertically-reciprocating means, and means for vertically reciprocating the pivoted end of said fingers, the free end of said fingers normally resting upon said rotary conveyer.

13. In a feeder for fruit-pitters, in combination, a revolving cutting-disk, an oppositely-revolving conveyer, beneath said disk, means for directing fruit to said conveyer, feed mechanism, comprising a revoluble disk, adapted to impinge forwardly of its bearings upon the fruits as the same are engaged by said conveyer, and adjustable means for vertically reciprocating said revoluble disk.

14. In a feeder for fruit-pitters, in combination, a revolving cutting-disk, an oppositely-revolving conveyer beneath said disk, means for directing fruit to said conveyer, feed mechanism, comprising a revoluble disk, adapted to impinge forwardly of its bearings upon the fruits as the same are engaged by said conveyer, adjustable means for vertically reciprocating said revoluble disk, and means preventing said revolving conveyer throwing the fruits out therefrom.

15. In a feeder for fruit-pitters, in combination, a revolving cutting-disk, an oppositely-revolving conveyer beneath said disk, means for directing fruit to said conveyer, feed mechanism, comprising a revoluble disk, adapted to impinge forwardly of its bearings upon the fruits as the same are engaged by said conveyer, adjustable means for vertically reciprocating said revoluble disk, and means preventing said revolving conveyer throwing the fruits out therefrom, and for positioning said fruits for the operation of said cutting-disk thereon.

16. In a feeder mechanism for fruit-pitters, in combination, a revolving cutting-disk, an oppositely-revolving conveyer in operative relation thereto, said conveyer having a succession of flights adapted to feed the fruits to the cutting-disk, means for feeding the fruits singly to said conveyer, in advance of the lugs thereof, and a vertically-reciprocating revoluble feeder adapted to impinge against the rear of the fruits as the same are engaged by said lugs.

17. In a feeder mechanism for fruit-pitters, in combination, a revolving cutting-disk, an oppositely-revolving conveyer in operative relation thereto, said conveyer having a succession of flights adapted to feed the fruits to the cutting-disk, means for feeding the fruits singly to said conveyer, in advance of the lugs thereof, and a vertically-reciprocating revoluble feeder adapted to impinge against the rear of the fruits as the same are engaged by said lugs, and means preventing said revolving conveyer throwing the fruits out therefrom.

18. In a feeder mechanism for fruit-pitters, in combination, a revolving cutting-disk, an oppositely-revolving conveyer in operative relation thereto, said conveyer having a succession of flights adapted to feed the fruits to the cutting-disk, means for feeding the fruits singly to said conveyer, in advance of the lugs thereof, a vertically-reciprocating revoluble feeder adapted to impinge against the rear of the fruits as the same are engaged by said lugs and means preventing said revolving conveyer throwing the fruits out therefrom, and positioning said fruits for the operation of said cutting-disk thereon.

19. In a feeder mechanism for fruit-pitters, in combination, a revolving cutting-disk provided with forwardly-projecting peripheral knives, a revolving conveyer beneath said disk, said conveyer being provided with a succession of lugs adapted to feed the fruits to the cutting-disk, means for conveying the fruits singly to said conveyer and in advance of the lugs thereof, feed-guarding mechanism, and a bifurcated reciprocatory plate adapted to straddle the path of movement of the knives of the cutting-disk, and to carry a member connected with said feed-guarding mechanism.

20. In a feeder mechanism for fruit-pitters, in combination, a revolving cutting-disk, a two-part rotary conveyer adjacent to said disk, a series of feed-lugs carried by one part of the conveyer, a series of oppositely-disposed feed-lugs carried by the other part of said conveyer, means for conveying the fruits singly to said conveyer and in advance of the respective pair of lugs thereof, a two-part revoluble feeder, and means for reciprocating said feeder to move it into contact with the rear portion of the moving fruits.

21. In a feeder mechanism for fruit-pitters, in combination, a revolving cutting-disk, a two-part rotary conveyer adjacent to said disk, a series of feed-lugs carried by one part of the conveyer, a series of oppositely-disposed feed-lugs carried by the other part of said conveyer, means for conveying the fruits singly to said conveyer and in advance of the respective pair of lugs thereof, a two-part revoluble feeder, means preventing said rotary conveyer throwing the fruits out therefrom, and means for reciprocating said feeder to move it into contact with the rear portion of the moving fruits.

22. In a feeder mechanism for fruit-pitters, in combination, a revolving cutting-disk, a two-part rotary conveyer adjacent to said disk, a series of feed-lugs carried by one part of the conveyer, a series of oppositely-disposed feed-lugs carried by the other part of said conveyer, means for conveying the fruits singly to said conveyer and in advance of the respective pair of lugs thereof, a two-part revoluble feeder, and means for reciprocating said feeder to move it into contact with the rear portion of the moving fruits, and means preventing said rotary conveyer throwing the fruits out therefrom, and positioning said fruits for the operation of said cutting-disk thereon.

23. A feeder mechanism for fruit-pitters provided with a two-part circular feeder rotatably mounted between two pivoted fingers, and means for conducting fruits upwardly and forwardly under said fingers, said fingers adapted to be lifted by the advancing fruits.

24. A feeder mechanism for fruit-pitters provided with a two-part circular feeder rotatably mounted between two pivoted fingers, means for conducting fruits upwardly and forwardly under such fingers, said fingers adapted to be lifted by the advancing fruits, and means for vertically reciprocating said feeder.

25. In a feeder mechanism for fruit-pitters, in combination, a revolving cutting-disk, a revolving conveyer beneath said disk, said conveyer having lugs adapted to feed the fruits singly to the cutting-disk, means for directing the fruits to said conveyer in advance of the lugs thereof, a revoluble feeder, and means for vertically reciprocating said feeder to move it into contact with the fruits when the central portion of a fruit has advanced beyond the bearings of the feeder.

26. In a feeder mechanism for fruit-pitters, in combination, a revolving cutting-disk, a revolving conveyer beneath said disk, said conveyer having lugs adapted to feed the fruits singly to the cutting-disk, means for directing the fruits to said conveyer in advance of the lugs thereof, a revoluble feeder, guarding means preventing said revolving conveyer throwing the fruits out therefrom, and means for vertically reciprocating said feeder to move it into contact with the fruits when the central portion of a fruit has advanced beyond the bearings of the feeder.

27. In a feeder mechanism for fruit-pitters, in combination, a rotary cutting-disk, an inclined feed-trough, a rotary conveyer adjacent to the lower end of the feed-trough and provided along its periphery with a series of feed-lugs, an upright reciprocatory member, a pair of fingers having one end pivoted to said member and the other end extending over the rotary conveyer, and a rotatable feeder mounted between said fingers.

28. In a feeder for fruit-pitters, in combination, a rotary cutting-disk, an inclined feed-trough, a rotary conveyer adjacent to the lower end of the feed-trough and provided along its periphery with a series of spaced feed-lugs, a pair of fingers mounted in fixed relation to each other, the lower edge thereof on a level with each other, and astride the plane of the cutting-disk, a vertically-reciprocating member pivotally connected with said pair of fingers, and a feeding device mounted on the fingers between their pivot and free ends.

29. In a feeder for fruit-pitters, in combination, a rotary cutting-disk, provided with forwardly-projecting peripheral blades, an inclined feed-trough, a rotary conveyer adjacent to the lower end of the feed-trough and provided along its periphery with a series of spaced feed-lugs, a pair of fingers mounted in fixed relation to each other, the lower edge thereof on a level with each other, and astride the plane of the cutting-disk, a vertically-reciprocating member pivotally connected with said pair of fingers, and a feeding device mounted on the fingers between their pivot and free ends.

30. In a feeder for fruit-pitters, in combination, a rotary cutting-disk, an inclined feed-trough, a conveyer adapted to receive fruits singly therefrom, a bifurcated oscillating plate above the lower end of the feed-trough, a roller adapted to travel on said plate, and feed mechanism supported by said roller.

31. In a feeder for fruit-pitters, the combination, with rotary cutting mechanism, of means provided with flights for conveying fruit thereto, means for directing fruit to said conveying means, a reciprocating rotary feeder mounted on and between fruit guarding and controlling means, and fingers for regulating the vertical reciprocation thereof.

32. In a feeder mechanism for fruit-pitters, the combination, with rotary cutting mechanism, of a rotary conveyer operating in conjunction therewith, a reciprocating trough leading to said conveyer, vertically-reciprocating pivoted fingers mounted above said trough, the free ends thereof adapted to bear on the fruit as carried up by said conveyer, a rotary feeder carried by said fingers, and means whereby the vertical reciprocation of said fingers and feeder may be regulated.

33. In a feed mechanism for a fruit-pitter, the combination, with a rotating cutter of a revolving conveyer operating in conjunction therewith, means for directing fruits to said conveyer, a rotary feeder operating in conjunction therewith to insure feeding of the fruits singly and positively to said conveyer, and bifurcated means adapted to position and hold a fruit on said conveyer in the path of said cutter and through the bifurcation of which said cutter is adapted to operate on the fruit.

34. In a feed mechanism for fruit-pitters, a feed-trough, a rotary conveyer provided with flights, said conveyer adapted to receive fruits from said trough, a rotary vertically-reciprocating feeder above the end of said trough, vertically-reciprocating resilient means sustaining said feeder, and a roller connected with said feeder and adapted to travel on said means.

35. In a feed mechanism, for fruit-pitters, a V-shaped feed-trough, a rotary conveyer provided with flights, said conveyer adapted to receive fruits from said trough, and a pivoted guard, one end of said guard extending over said conveyer and adapted to hold fruits thereon, the other end of said guard extending over said trough at such a distance from the bottom thereof as to prevent fruits from passing therefrom except in single file.

36. In a feeder mechanism for fruit-pitters, a feed-trough, a conveyer having flights adapted to receive fruits therefrom, a rotary feeder at the delivery end of said trough and resilient means for suspending said feeder, a support for said feeder resting loosely on said means, and mechanism for reciprocating said means.

37. In a feeder mechanism for fruit-pitters, a feed-trough, a conveyer having flights adapted to receive the fruits from said trough, a rotary feeder above the delivery end of the trough, an oscillatory arm, mechanism for oscillating said arm, a spring carried by said arm, and means resting on said spring and sustaining said feeder.

38. In a feed mechanism for fruit-pitters, a vibratory feed-trough, conveying means adapted to receive fruit from said trough and carry it upward, a revoluble feed-disk above the delivery end of the trough, an oscillatory plate, means for vertically reciprocating said plate, and means for suspending said feed-disk from said plate.

39. In a feed mechanism for fruit-pitters, a vibratory feed-trough, conveying means adapted to receive fruit from said trough and carry it upward, a revoluble feed-disk above the delivery end of the trough, an oscillatory member having a flat upper face, said face passing through a horizontal position during the oscillation thereof, a roller adapted to travel on said face, and means suspending said feed-disk from said roller.

40. In a feed mechanism for fruit-pitters, a vibratory feed-trough, conveying means adapted to receive fruit from said trough and carry it upward, a revoluble feed-disk above the delivery end of the trough, a roller, an oscillatory leaf-spring on the upper face of which said roller is adapted to travel, means for oscillating said spring, and means connecting said feed-disk with said roller.

41. In a feed mechanism for fruit-pitters, a feed-trough, conveying means adapted to receive fruit from said trough and carry it upward, a revoluble feeder above the delivery end of the trough, a roller, an oscillatory leaf-spring on the upper face of which said roller is adapted to travel, an oscillatory support for said spring extending thereunder and moving therewith, means for oscillating said support and spring, and means connecting said feed-disk with said roller.

In testimony whereof I have signed my name to this specification, in the presence of two subscribing witnesses, at Los Angeles, in the county of Los Angeles and State of California, this 23d day of July, 1903.

JOHN SMITH BRIGGS.

Witnesses:
ALBERT H. MERRILL,
JULIA TOWNSEND.